US009562966B1

(12) United States Patent
Degges, Jr. et al.

(10) Patent No.: US 9,562,966 B1
(45) Date of Patent: Feb. 7, 2017

(54) SURFACE DISTANCE DETERMINATION USING REFLECTED LIGHT

(71) Applicant: Amazon Technologies, Inc., Seattle, WA (US)

(72) Inventors: Ronald Joseph Degges, Jr., Los Gatos, CA (US); Qiang Liu, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/742,218

(22) Filed: Jun. 17, 2015

Related U.S. Application Data

(63) Continuation of application No. 13/789,516, filed on Mar. 7, 2013, now Pat. No. 9,062,969.

(51) Int. Cl.
| | |
|---|---|
| *G01C 3/08* | (2006.01) |
| *G01J 1/42* | (2006.01) |
| *G01C 3/00* | (2006.01) |
| *G01S 7/486* | (2006.01) |
| *G01S 17/08* | (2006.01) |

(52) U.S. Cl.
CPC .............. *G01S 7/4865* (2013.01); *G01S 17/08* (2013.01)

(58) Field of Classification Search
CPC .... G01S 7/4865; G01S 17/08; G01S 17/4915; G01S 17/88; A61K 31/506; A61K 31/5383; A61K 31/538; A61K 31/5377; C07D 455/02; C07D 498/04; G01C 3/00; G01C 3/08; G01C 3/42; G01J 1/42
See application file for complete search history.

(56) References Cited

U.S. PATENT DOCUMENTS

| | | |
|---|---|---|
| 7,418,392 B1 | 8/2008 | Mozer et al. |
| 7,684,016 B1 * | 3/2010 | Schaefer ............... G01S 7/491 356/4.01 |

(Continued)

FOREIGN PATENT DOCUMENTS

WO      WO2011088053 A2     7/2011

OTHER PUBLICATIONS

Office Action for U.S. Appl. No. 13/789,516, mailed on Jun. 19, 2014, Degges, Jr. et al., "Surface Distance Determination Using Reflected Light", 14 pages.

(Continued)

*Primary Examiner* — Luke Ratcliffe
*Assistant Examiner* — Vicente Rodriguez
(74) *Attorney, Agent, or Firm* — Lee & Hayes, PLLC

(57) ABSTRACT

A distance between a light source and a surface may be determined by emitting pulses of light from the light source and measuring an intensity of the light after the light reaches the surface. To determine a true distance, aliased distances, which are outside of a known distance segment, are disregarded. The distance segment may be defined by a modulation period of light emitted by the light source. The distance segment may be determined based on a ratio of a measured intensity of light captured during a first time interval and a second time interval, and a comparison of other types of evidence data that identifies a correct distance segment. The evidence data may include data associated with the amplitude (intensity) of the light captured, temporal variations in data, and/or analysis data collected from other surfaces that are adjacent to the surface.

20 Claims, 11 Drawing Sheets

(56) References Cited

U.S. PATENT DOCUMENTS

| | | |
|---|---|---|
| 7,720,683 B1 | 5/2010 | Vermeulen et al. |
| 7,774,204 B2 | 8/2010 | Mozer et al. |
| 2011/0063433 A1 | 3/2011 | Thonhauser |
| 2011/0216304 A1* | 9/2011 | Hall ..................... G01S 7/4813 |
| | | 356/4.01 |
| 2012/0223885 A1 | 9/2012 | Perez |
| 2013/0169947 A1 | 7/2013 | Hakim et al. |

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

SURFACE DISTANCE DETERMINATION USING REFLECTED LIGHT

CROSS-REFERENCE TO RELATED APPLICATIONS

This application is a continuation of, and claims priority to, co-pending, commonly-owned U.S. patent application Ser. No. 13/789,516, entitled "Surface Distance Determination Using Reflected Light", filed on Mar. 7, 2013, which application is incorporated herein in its entirety by reference.

BACKGROUND

A distance between objects can be measured by emitting light and measuring a time-of-flight of the light between the objects. Traditional measurement of light using time-of-flight uses light and calculates a distance based on the amount of time between the emission of the light and a time when the light is captured at a sensor. Typically, the sensor is located near a light source that emits the light.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques to determine a distance associated with a surface. In some embodiments, the determination may directly or indirectly measure time-of-flight (ToF) of a plurality of pulses of light, the pulses possibly occurring at a predetermined frequency. The pulses of light and corresponding intervals between the pulses of light may be substantially equal in length of time and be graphically represented by a square wave. However, other pulse patterns may be employed that do not include equal lengths of time (e.g., emit light for 0.25 µs every 1 µs, etc.). At least one light sensor may detect or capture light from the pulses of light being reflected off a surface. A phase difference in the captured pulses of light may be determined based on an amount of light captured at different time intervals during a cycle of the predetermined frequency. In accordance with various embodiments, a distance between the at least one light sensor and the surface may be calculated using a ratio representative of the phase difference.

The calculated distance may be within a distance segment (e.g., 0-4 m) of a plurality of distance segments defined by a distance of light travel during a modulation period (cycle) of the predetermined frequency (e.g., 40 MHz), or the calculated distance may be in a different distance segment (e.g., 4-8 m, 8-12 m, and so forth assuming 4 m increments). The true distance may be determined based at least in part on the ratio defined by an amount of light captured during a first time interval and a second time interval (e.g., the calculated distance), and a comparison of other types of evidence data that identifies a correct distance segment associated with the calculated distance. The evidence data may include data associated with the amplitude (intensity) of the light captured, temporal variations in data, and/or analysis data collected from other surfaces that are adjacent to the surface (e.g., other pixels or surface segments).

The calculated distance may be used to determine movement of a surface and/or one or more surface locations of a surface. In some instances, the calculated distance may be used to identify a profile of a surface, which may then be used to associate the profile with an object, a command, or another association.

The systems and techniques described herein may be implemented in a number of ways. Example implementations are provided below with reference to the following figures.

Figure 1:
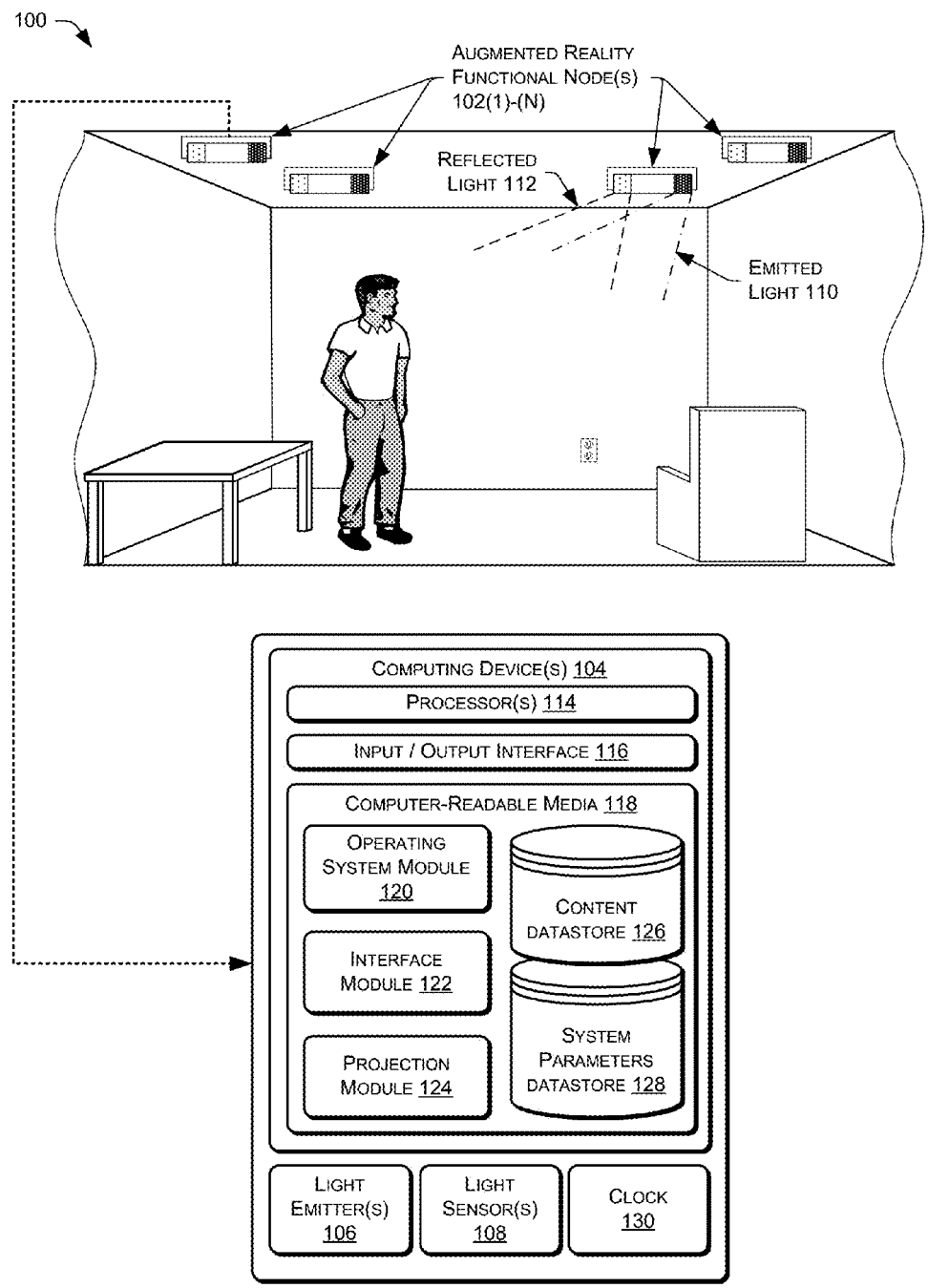
FIG. 1 illustrates an environment that includes an augmented reality functional node (ARFN) and a user that may interact with the ARFN.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more light sources 106 that, when active, emit light onto any surface within the environment 100.

In some embodiments, the light source(s) 106 may include one or more projectors that project content onto any surface. The projected content may include electronic books, videos, images, interactive menus, or any other sort of visual content.

For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more light sensor(s) 108 that may capture light that is emitted from the light source(s) 106 and reflected off a surface.

In some embodiments, the light sensor(s) may be used to determine movement of surfaces, such as movement of user operating the UI. In response, the ARFN 102 may provide feedback to the user and/or may cause performance of actions corresponding to the user's operation of the UI. For instance, when the ARFN 102 projects a remote control, the ARFN 102 may provide feedback to the user indicating which button(s) a user is in position to select, may identify a user's selection (e.g., a selection to power on the television) and, in response, may operate the television according to an identified selection. While a few examples have been given, it is to be appreciated that the ARFN 102 may project any other sort of content within the environment 100. In addition, the ARFN 102 may recognize and interpret gestures that are made by the user without reference to a UI projected within the environment. In addition, the ARFN 102 may recognize and interpret gestures that are made by the user, and based on the gestures, generate a UI (e.g., a virtual UI) projected within the environment.

In this example, one of the ARFNs 102 within the environment is shown to provide emitted light 110 as pulses of light. In addition, the ARFN may capture reflected light 112 within the environment for the purpose of identifying distances between the ARFN and a surface that reflects the light.

While FIG. 1 illustrates one ARFN emitting the emitted light 110 and receiving the reflected light 112, in some implementations, one or more other ARFNs may additionally or alternatively perform one or both of these functions. In either instance, by scanning the environment in this manner, the ARFNs 102 may identify the location (e.g., distances) of objects within an environment and movement of the objects. In some instances, the objects may be people and the movements may be gestures performed by people within the environment. Such gestures may be interpreted as instructions or commands to be implemented by the ARFNs 102.

As illustrated, the computing device 104 of the example ARFN 102 includes one or more processors 114, an input/output interface 116, and computer-readable media 118. The processors 114 may be configured to execute instructions, which may be stored in the computer-readable media 118 or in other computer-readable media accessible to the processors 114.

Figure 2:
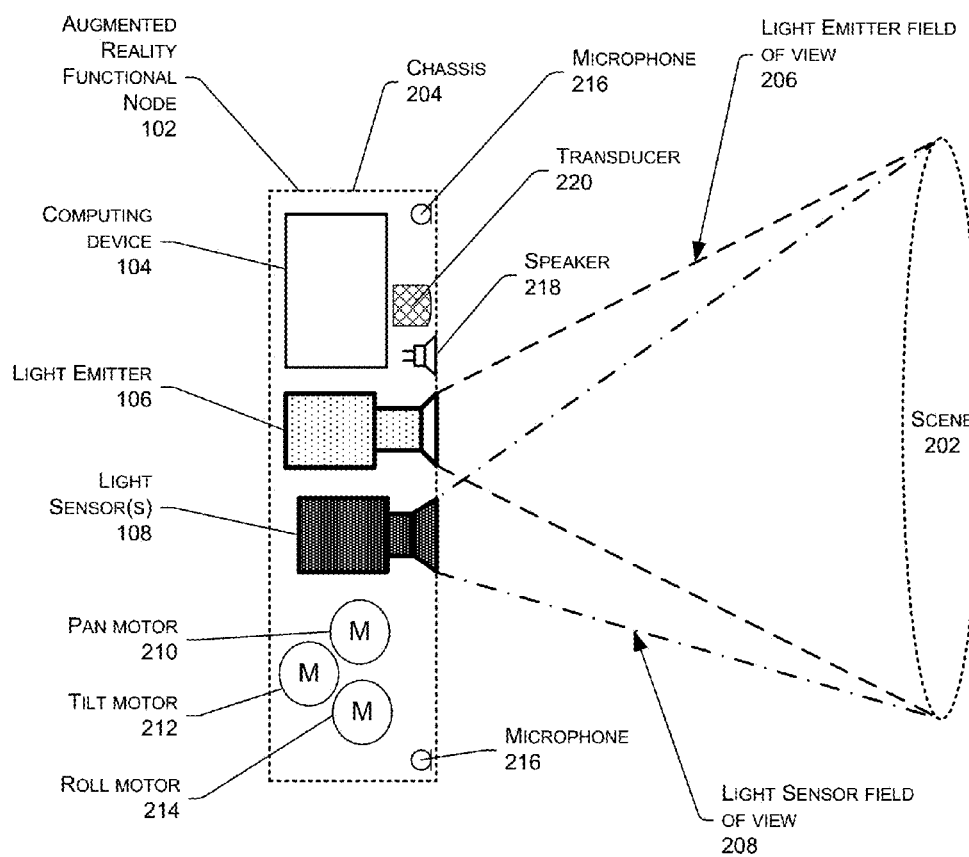
FIG. 2 illustrates an example ARFN that includes a computing device, a light source, light sensor(s), and other selected components for allowing a user to interact with the ARFN.

The input/output interface 116, meanwhile, may be configured to couple the computing device 104 to other components of the ARFN 102, such as the light source 106, the light sensor 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the light source 106 or the light sensor 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse data captured by the light sensors 108 to identify hand gestures made by users within the environment 100. In response to identifying a predefined gesture, the interface module 122 may interpret the gesture and cause the ARFN 102 to perform a corresponding action.

For instance, if a user within the environment 100 makes a gesture requesting that the ARFN 102 project a certain piece of content, then the interface module 122 may interpret the gesture and cause the projection module 124 to project the content via the light source 106.

The content datastore 126, meanwhile, stores content for outputting within the environment. For instance, the content datastore may store applications and data for use within the environment 100. The projection module 124 may access the content datastore 126 in order to project requested content within the environment 100. For instance, when the user requests that the ARFN 102 project a particular electronic book, the projection module 124 may access the content datastore 126 to retrieve and cause projection of the desired electronic book.

The computer-readable media 118 may store the system parameters datastore 128, which is configured to maintain information about the state of the computing device 104, the light source 106, the light sensor 108, and so forth. For example, and as described in detail below, the ARFN 102 may be configured to pan and tilt for the purpose of allowing the light source 106 and the light sensor 108 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

In some embodiments, the computing device 104 may include a clock 130 to generate a clock cycle. The clock cycle may be used by the light emitters 106 and/or the light sensors 108 to control operation of the respective devices during time-of-flight of light measurements as discussed in greater detail below. In some instances, the clock 130 may be integrated with the processor(s) 114, one or more of the light source(s), 106, or another device.

FIG. 2 shows additional details of an example ARFN 102 that may be configured to measure distances of surfaces, identify movement of the surfaces (or objects), project a user interface (UI), and/or to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more light sources 106 may be disposed within the chassis 204 and may be configured to generate and project light and/or images into the scene 202. The light may include visible light, non-visible light, or both. The images may be visible light images perceptible to the user, visible light images imperceptible to the user, images with non-visible light, or a combination thereof. The light source 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The light source 106 may have a light source field of view 206 which describes a particular solid angle. The light source field of view 206 may vary according to changes in the configuration of the light source 106. For example, the light source field of view 206 may narrow upon application of an optical zoom to the light source 106. The light source field of view 206 may result in emission of light over a small surface area or a larger surface area.

One or more light sensors 108 may also be disposed within the chassis 204. The light sensors 108 are configured to receive light emitted by the light source 106 and reflected off a surface in the scene 202. Thus, the light sensors 108 receive reflected light. The light sensors 108 have a light sensor field of view 208 that describes a particular solid angle. The light sensor field of view 208 may vary according to changes in the configuration of the light sensor(s) 108. For example, an optical lens included with one of the light sensors may narrow the light sensor field of view 208. The light sensor field of view 206 may result in capture of light from a small surface area or a larger surface area, and may align with the light source field of view 206.

In some implementations, a plurality of light sensors 108 may be used where each light sensor includes a photodiode and a storage element. In some embodiments, a light sensor may be equipped a photodiode that is shared by a plurality of storage elements, which each store energy during intervals of time. The storage elements may be any electronic/semiconductor device structures that can store energy as a charge. Examples include, without limitation, capacitors and charge-coupled devices. These storage elements may be used to create data that indicates a distance of an object or surface in the scene 202, as explained in further detail below regarding discussion of time-of-flight of light.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the light source(s) 106 and/or the light sensor(s) 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

In other implementations, the components of the ARFN 102 may be distributed in one or more locations within the environment 100. As mentioned above, microphones 216 and speakers 218 may be distributed throughout the scene. The light source 106 and the light sensor 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
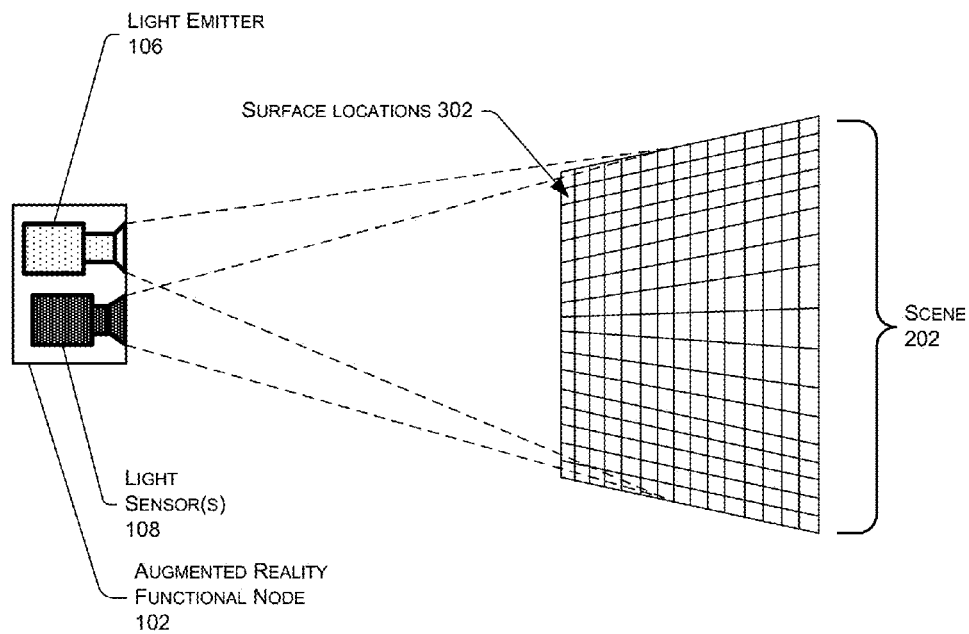
FIG. 3 is an illustrative diagram of the ARFN using a light source and light sensors to identify surfaces, objects, and user interactions within an environment. By identifying user interactions, the ARFN is able to determine when a user is requesting that the ARFN perform a specified action.

FIG. 3 is an illustrative diagram of the ARFN 102 using ToF data to determine location and distance information regarding users, user hands, and other objects within an environment. However, while the techniques described herein provide one example for obtaining distance information regarding these objects, it is to be appreciated that distance information may be determined in other manners in other embodiments. In addition, the distance information may be used to determine three-dimensional (3D) information about objects.

In the instant illustration, the light source 106 emits pulses of light onto the scene 202. The pulses of light may be synchronized with a clock cycle from the clock 130 and include intervals of "on" and "off", which can be represented by a square wave. The pulses of light may be emitted in wavelengths that are visible to the user, non-visible to the user, or a combination thereof.

The light sensors 108 may be used to receive the emitted light after the light is reflected off objects or surfaces in the scene 202. The light sensors 108 may measure reflected light at specific surface locations 302 to determine a distance of objects or surfaces in the scene 202. For example, a pair of sensors may be used to measure the distance of a surface of a plurality of surface locations that reflect light. The surface locations 302 may be mapped over a wall, over objects (including people), or over any other surface included in an environment. The light sensors 108 may include elements to store measured light for each of the surface locations 302. Thus, the light sensors 108 may store a pixilated view of the surface locations, which may later be used to reproduce information about the scene 202.

The surface locations 302 may be represented as a grid for ease of illustration and not as a limitation. In other implementations other patterns, such as bars, dots, and so forth may be used. For example, the scene 202 may be analyzed as the plurality of surface locations 302 in a grid of [A×B] size, where the number of surface locations 302 is the product of A and B. For example, if the grid is [320×240], then the number of surface locations 302 is 76,800. Thus, in the example above, each of the 76,800 surface locations may be sensed by respective pairs of light sensors, thus 153,600 light sensors may be used in this example when two light sensors are used for each surface location. Other quantities of light sensors may also be used. The light sensors 108 may be formed on one or more silicon chips. For example, the light sensors 108 may be implemented as capacitors that store energy associated with an amount of light received from a respective surface location during a predetermined amount of time.

Figure 4:
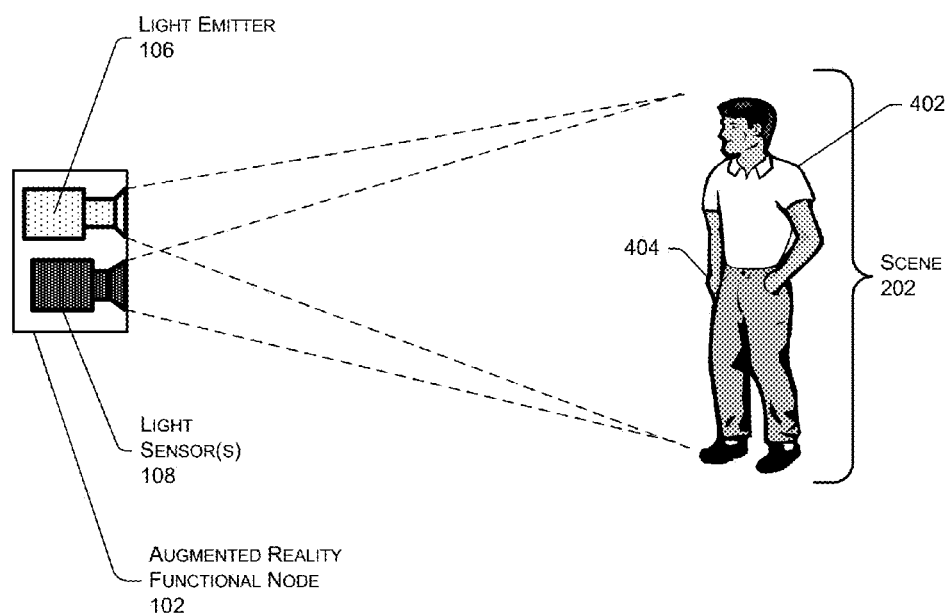
FIG. 4 is an illustrative diagram of the ARFN detecting the pose of a person within an environment.

FIG. 4 is an illustrative diagram of the ARFN 102 detecting the pose of a person within an environment. As discussed above, the light sensors 108 detect the light reflected from surfaces within the scene 202. The light sensors 108 may provide data that enables identification of a user 402 and/or other objects within the environment. In some instances, this information may be utilized to identify user gestures and trajectories of these gestures, such as a trajectory of a hand 404 of the user 402 or other body part of the user 402. The light sensors 108 may also provide data that can be used to identify a location of a selection tool (e.g., a user's finger) as this location changes over time. The ARFN 102 may then use these locations tracked over time to identify a trajectory of the gesture.

FIGS. 5A-5D illustrate techniques to determine distance information using ToF data obtained by capturing light emitted by a light source and reflected off a surface. The captured light is used to determine a distance between the surface and the light source.

Figure 5A:
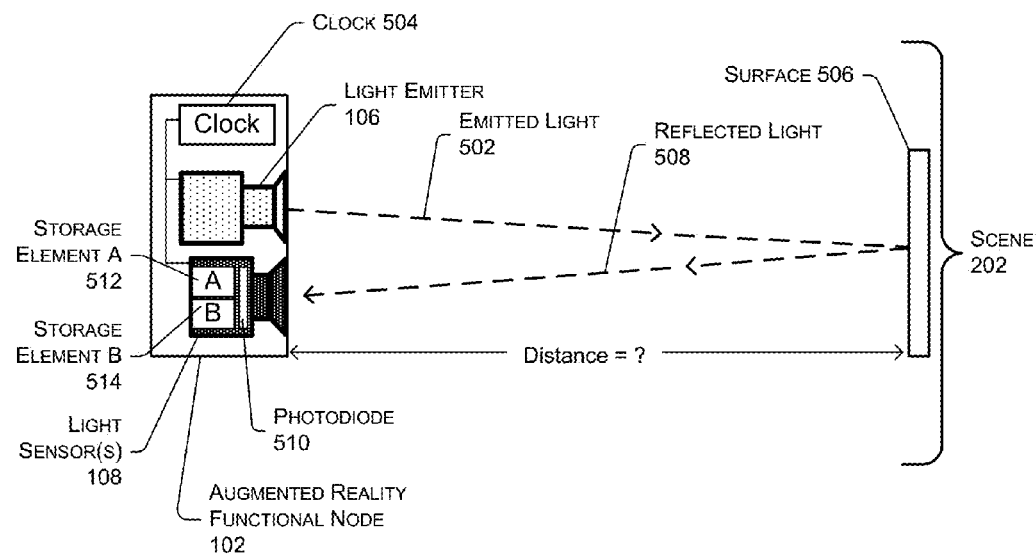
FIGS. 5A-5D illustrate basic techniques to determine distance information using time-of-flight (ToF) data obtained by capturing light emitted by a light source and reflected off a surface. The captured light is used to determine a distance from the surface.

FIG. 5A shows the light source 106 that emits light (emitted light 502) projected in a direction toward the scene 202. The emitted light 502 is generated by pulsing light on and off by the light source 106 based on a clock cycle from a clock 504. The pulses of light may be represented by a square wave, which is shown and discussed with reference to FIG. 5B. However, other pulses patterns may be employed that do not include equal lengths of time (e.g., emit light for 0.25 µs every 1 µs, etc.) Meanwhile, the emitted light 502 may be reflected off a surface 506, such as off an object, a person, clothing, tools, and so forth. Reflected light 508 may travel back toward the light sensor(s) 108.

In accordance with one or more embodiments, the light sensor(s) 108 may include a photodiode 510, a storage element A 512 and a storage element B 514. In these embodiments, the photodiode 510 may be shared by multiple storage elements. However, some configurations may include a separate photodiode for each storage element. For the sake of the following discussion (and through this document), either configuration may be used. The storage elements A and B may store energy from the reflected light 508 captured by the photodiode at different intervals of time. For example, the storage element A 512 may cycle on at a first time and off at a second time while the storage element B 514 may cycle off at the first time and on at the second time in opposite alternation (inverse synchronization) with the storage element A 512. In some embodiments, additional storage element may be used in addition to the storage element A 512 and the storage element B 514, which may store energy from light at different intervals and/or overlapping intervals. The storage elements 512 and 514 may be capacitors or other hardware used to store energy converted from light. At some points, the discussion below may refer to a capture of light from different light sensors, however, it shall be understood that a light sensor with a shared photodiode can capture different time intervals of light using multiple storage elements, and thus may perform the function of multiple sensors.

Figure 5B:
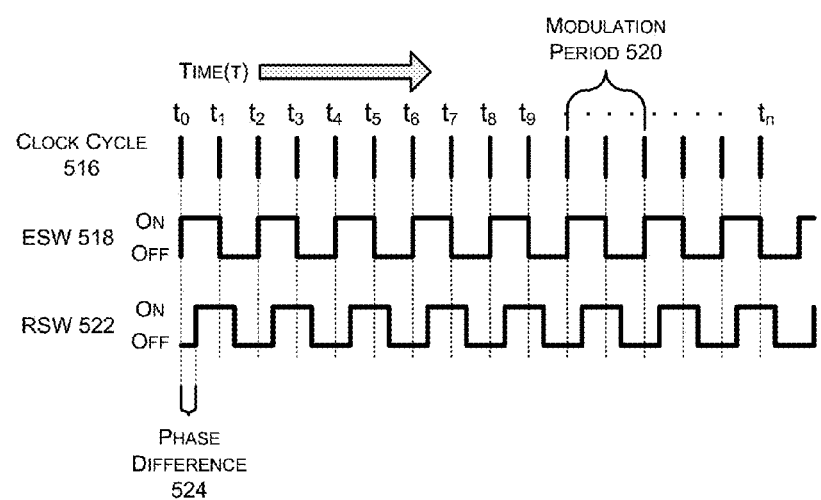

FIG. 5B shows a clock cycle 516 plotted with respect to time (t). The clock cycle 516 may be generated by the clock 504 and include equal segments of time based on a predetermined frequency. In addition, FIG. 5B shows an emitter square wave (ESW) 518 that represents a graph of the pulsing of light by the light source 106 between an on-state of operation and an off-state of operation. Although the various waves discussed herein are referred to as square waves, other types of waveforms may be employed to accomplish the same or similar results. In various embodiments, the on-state and the off-state may be equal in length of time and synchronized with the clock cycle 516. For example, the light source 106 may emit light for x clock cycles and then be off for x clock cycles until emitting light again for x clock cycles, and so forth. A modulation period 520 is defined by each complete cycle of the light source 106 operating the on-state and the off-state once. In the example above, the modulation period 520 is 2x.

FIG. 5B also shows a received square wave (RSW) 522 that represents a graph of the received pulses of the reflected light 508 as captured (stored, measured) by the light sensor 108. The RSW 522 shows when light is received (on) or not received (off), which is a function of the pulses of light generated by the light source 106. Unlike the ESW 518, the RSW 522 may not be synchronized with the clock cycle. A difference in the timing of the transitions of light (e.g., pulses) and the clock cycle is equal to a phase difference 524, which is shown in FIG. 5B, and dependent on a distance of travel of the reflected light 508. The phase difference may be used to determine a distance between the ARFN 102 and the surface 506. The use of the phase difference 524 is explained in further detail with reference to FIGS. 5C and 5D.

Figure 5C:
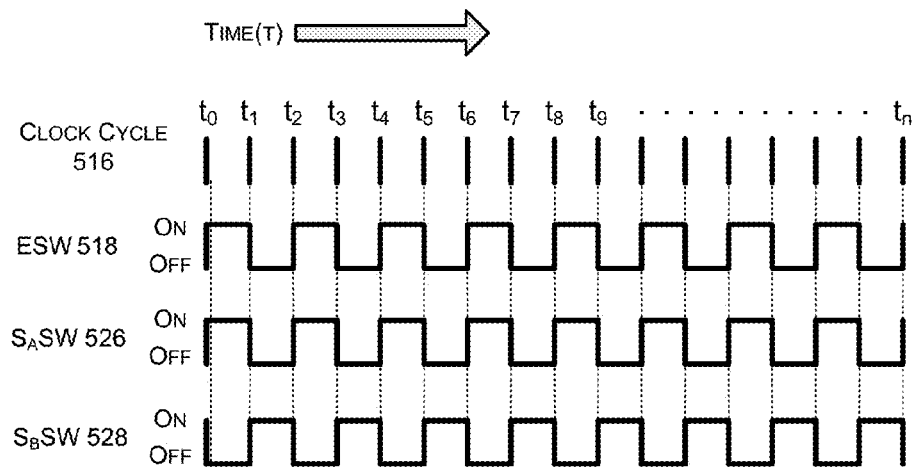

FIG. 5C shows the clock cycle 516, the ESW 518, and graphs depicting functionality of the light sensors 108 (i.e., the storage element A 512 and the storage element B 514) plotted with respect to time (t). In accordance with various embodiments, the storage element A 512 and the storage element B 514 may operate in synchronization with the clock cycle 516, and thus in synchronization with the ESW 518. In addition, the storage element A 512 may operate in opposite alternation (inverse synchronization) with the storage element B 514. Thus, when storage element A 512 is available to store energy from captured light, then storage element B 514 may be unavailable to store energy, and vice versa. A storage element A square wave ($S_A$SW) 526 shows an on-state and an off-state of the storage element A, where the storage element A and B are able to store energy when in the on-state and unable to store energy (e.g., off, blocked, disconnected, etc.) when in the off-state. The $S_A$SW 526 may be synchronized with the light source 106 (e.g., synchronized with the ESW 518, but not necessarily the same as the ESW). A storage element B square wave ($S_B$SW) 528 shows an on-state and an off-state of the storage element B, which is inversely synchronized with the $S_A$SW 526. The storage element A and B may be capacitors that receive a charge when light is captured by the photodiode 510 (i.e., the reflected light 508) during the on-state. The capacitors may be discharged after each modulation period or at other intervals (e.g., prior to oversaturation as discussed with reference to FIGS. 12 and 13). In various embodiments, additional storage elements may be employed in addition to the storage element A and B. In some embodiments, the storage element A and B may be implemented as separate sensors each having a photodiode that captures light in multiple time intervals (e.g., interval A and interval B), and so forth.

Figure 5D:
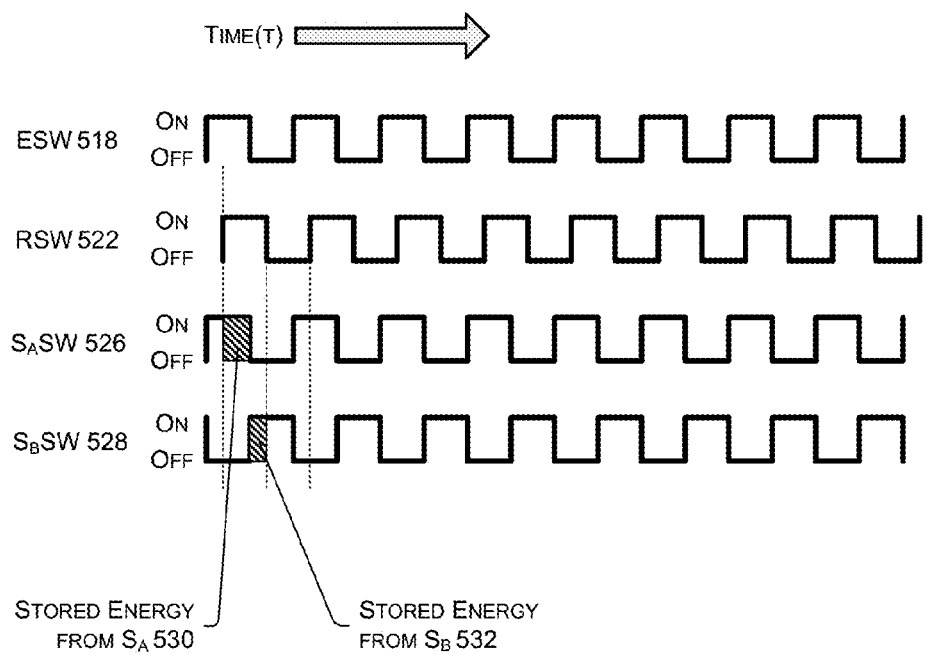

FIG. 5D shows the square waves discussed with reference to FIGS. 5B and 5C during an example plot of time-of-flight of pulses of light. When the $S_A$SW 526 is in the on-state and light is received by the light sensor(s) 108 (shown by the RSW 522), then the storage element A 512 may store energy from captured light such that an amount of light captured by the photodiode 510 can be measured during the on-state of the storage element A (e.g., by charging a capacitor, etc.). The amount of energy stored during this cycle of storage element A is shown as stored energy from storage element A ($SES_A$) 530. When the storage element A is in the off-state, the storage element A no longer stores energy, and thus the $SES_A$ 530 has achieved a maximum value during this modulation period. As discussed above, the storage element B 514 may transition to the on-state when the storage element A transitions to the off-state. When the $S_B$SW 528 is in the on-state and light is received by the light sensor(s) 108, then the storage element B 514 may store energy such that an amount of stored energy can be measured during the on-state of the storage element B (e.g., by charging a capacitor, etc.). The amount of energy stored during this cycle of storage element B is stored energy from storage element A ($SES_B$) 532. When the storage element B is in the off-state, the storage element B no longer stores energy, and thus the $SES_B$ 532 has achieved a maximum value during this modulation period.

Since light travels at a known velocity, a ratio of the $SES_A$ 530 and $SES_B$ 532 provides a linear plot, and thus allows calculation of a distance between the surface 506 and the ARFN 102 (or other known position) when the distance is within a predetermined range. The predetermined range is equivalent to the amount of time of the pulse of light (i.e., the on-state) from the light source 106 multiplied by the speed of light (approximately 300,000 km/s). For example, when the pulse is 0.5 µs, then the predetermined range is 150 meters. Thus, the ratio of the $SES_A$ 530 and $SES_B$ 532 enables determination of distances within a known 150 meter range in this example. Outside of this range, the ratio of $SES_A$ 530 and $SES_B$ 532 may correspond to different distances which have the same ratio value, such as distances of 75 meters and 225 meters in this example, both having ratios of 50:50 or one-half the predetermined distance. This creates an aliasing problem, which can be addressed in part by use and analysis of additional evidence as discussed below with reference to FIGS. 7-11.

FIGS. 6-9 and 11 show various processes to determine a distance using light reflected from an object or surface. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
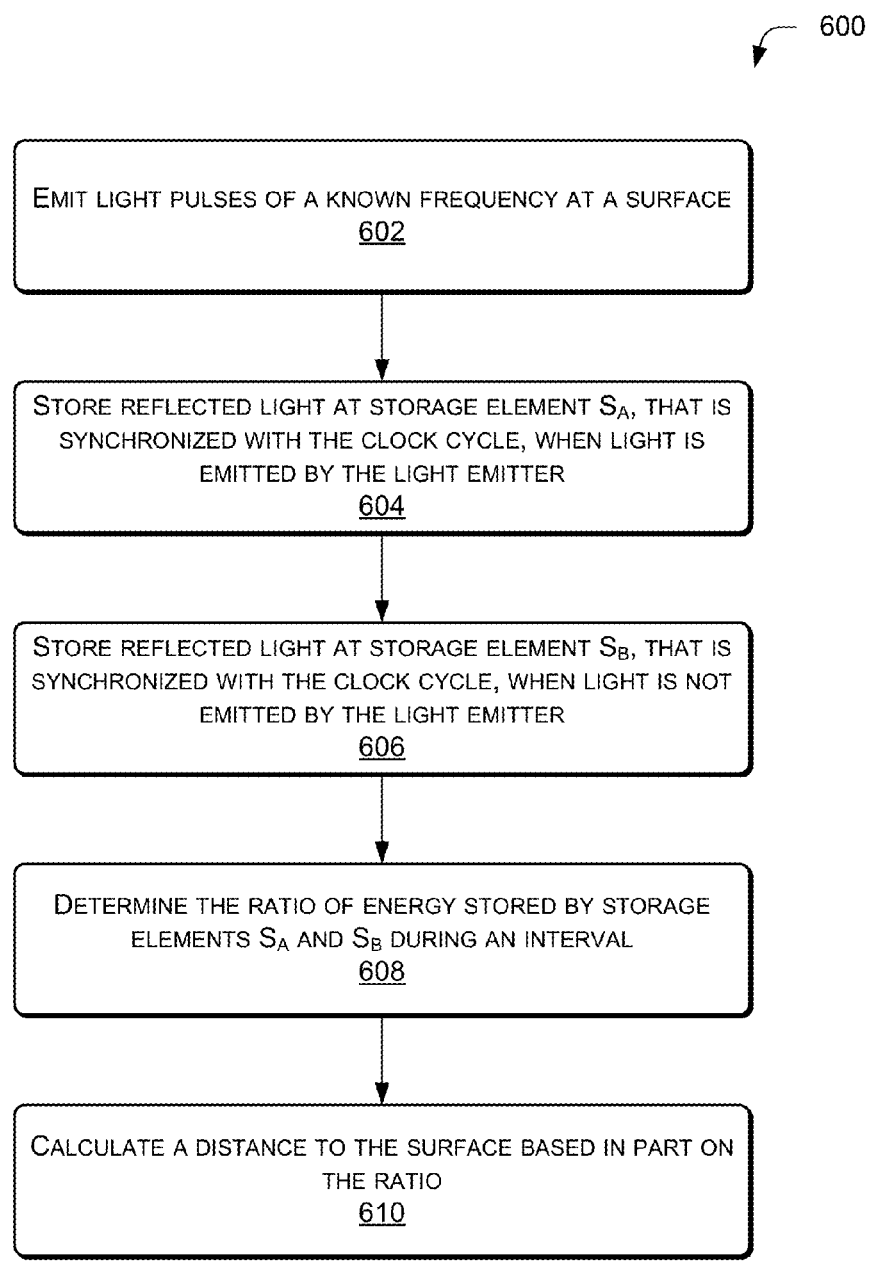
FIG. 6 illustrates a flow diagram of an illustrative process to calculate a distance using a ratio of light captured by various sensors or storage elements.

FIG. 6 illustrates an example flow diagram 600 of a process to calculate a distance using the ratio of light captured by various sensors or storage elements.

At 602, light pulses of a known frequency are emitted at a surface. The frequency may be synchronized with a clock cycle and may have equal lengths of time of emission of light and no emission of light (e.g., on/off). The light pulses may be represented by a square wave as shown in FIGS. 5B-5D; however, other waveforms may be used. The selection of the frequency determines the predetermined range of distances that can be determined using the ratio as discussed here. The selection of the frequency may also determine an accuracy of the measurements, and thus accuracy of the distance calculations. Distances outside of this range may have a same ratio when using two sensors or storage elements (e.g., $S_A$, $S_B$), and thus provide a duplication or aliasing effect.

At 604, reflected light is captured by the photodiode 510 and stored by the storage element A 512 when the storage element A is in the on-state and is able to store energy. The storage element A 512 may be synchronized with the clock cycle, and thus may store energy when the light source emits light in the on-state.

At 606, reflected light is captured by the photodiode 510 and stored by the storage element B 514 when the storage element B is in the on-state and is able to store energy. The storage element B 514 may operate in an opposite alternation with the storage element A, thus storage element B 514 may be operating in the on-state when the storage element A 512 is operating in the off-state. Therefore, the storage element B 514 may be inversely synchronized with the storage element A 512.

At 608, a ratio is determined for the amount of energy stored by the storage element A 512 ($SES_A$ 530) and the amount of energy stored by the storage element B 514 ($SES_B$ 532) during a modulation period or other interval of time.

At 610, a distance between the surface that reflects the light and the ARFN 102 is calculated based in part on the ratio, the predetermined frequency of the pulses of light, and the speed of light. As discussed above, the distance may be to be within a known distance segment (e.g., 0 m-4 m, etc.). In some instances, the distance segment may be determined using other evidence. The distance may then be assumed to be within the determined distance segment. FIGS. 7-11 describe use of various techniques to identify the distance segment.

Figure 7:
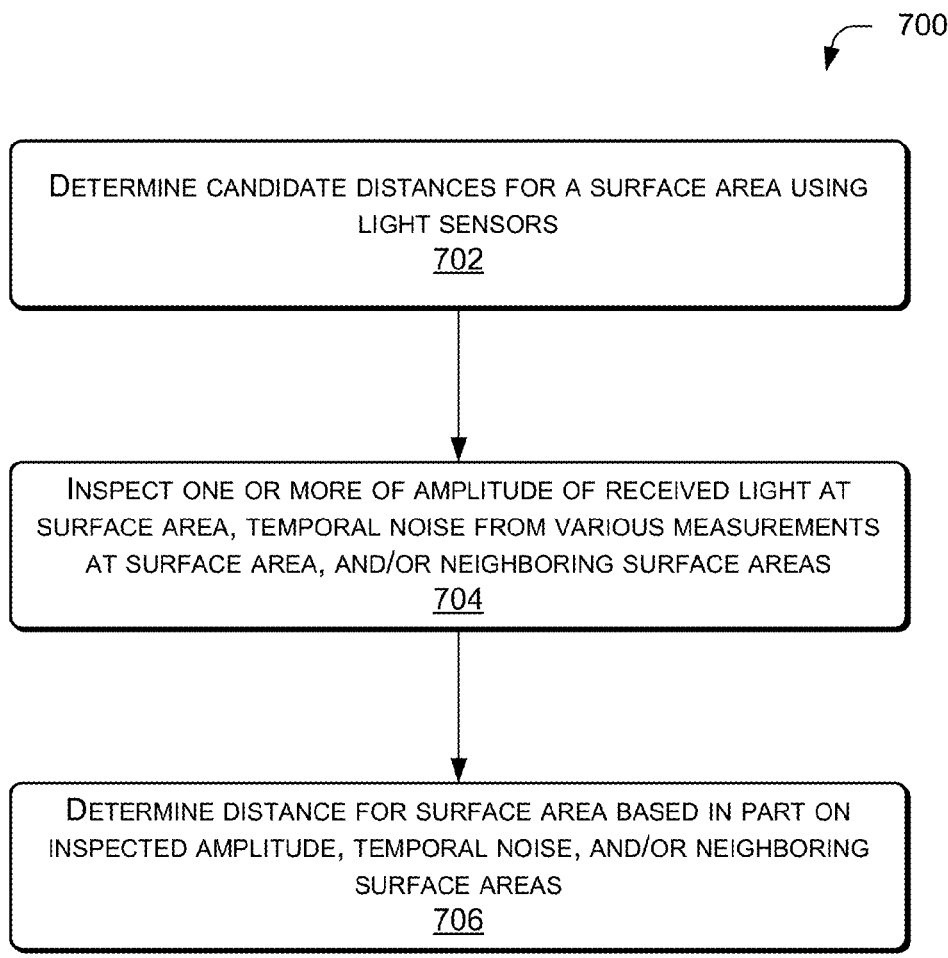
FIG. 7 is a flow diagram of an illustrative process to determine a distance segment of an object using a light sensor that senses light that is reflected from the object.

FIG. 7 is a flow diagram of an illustrative process 700 to determine a distance segment of an object using a light sensor that senses light that is reflected from the object.

At 702, candidate distances for a surface area may be determined using the light sensors. For example, the light sensors may store data in pixels that are associated with or mapped to surface areas. In some instances, and as discussed herein, a pixel may represent a predetermined surface area within a field of view of the light sensors. The light sensors may capture or detect light and then store data in many pixels. The candidate distances may be determined based on the process 600 described with reference to FIG. 6. For example, when the distance segment is 0-4 m, then the candidate distances may be distances in increments of 4 m (e.g., 1 m, 5 m, 9 m, etc.) due to the aliasing effect discussed above.

At 704, various attributes of data derived from the light detected by the light sensors may be inspected as evidence indicative of the distance segment for the true distance of the surface area (from among the candidate distances). One attribute is an amplitude or intensity of light detected by the light sensor. Since the amplitude of light is inversely proportional to distance, a low amplitude value may indicate, when compared to a baseline amplitude, that the true distance is further away than when the amplitude is a higher amplitude value. The baseline amplitude may be stored in a look up table or otherwise accessible for comparison purposes.

Another attribute is a variance in temporal data for a surface area. When the surface area is located further away from the light sensor, the data may include larger variations among a sample of data collected over a short period of time as compared to when the surface area is located closer to the light sensor. The variations may be based on minute movements of the surface area and the light sensor, imperfections in air between the surface area and the light sensor, thermal variations, and so forth. The sample data may be stored in a look up table or otherwise accessible for comparison purposes.

In some embodiments, adjacent surface areas may be inspected as evidence indicative of the distance segment for a surface area. For example, when the surface areas are represented by pixels, then the pixels that surround a center pixel (e.g., center pixel of a 3×3 grid of pixels, etc.) may be used to determine a distance segment for the center pixel. Each of these inspections is discussed in further detail below.

At 706, the distance for the surface area may be determined based in part on at least some of the inspected information from the operation 704. For example, the inspected information may determine a likely distance segment of the surface. A candidate distance that is in the distance segment may then be selected as the true distance associated with the surface area.

Figure 8:
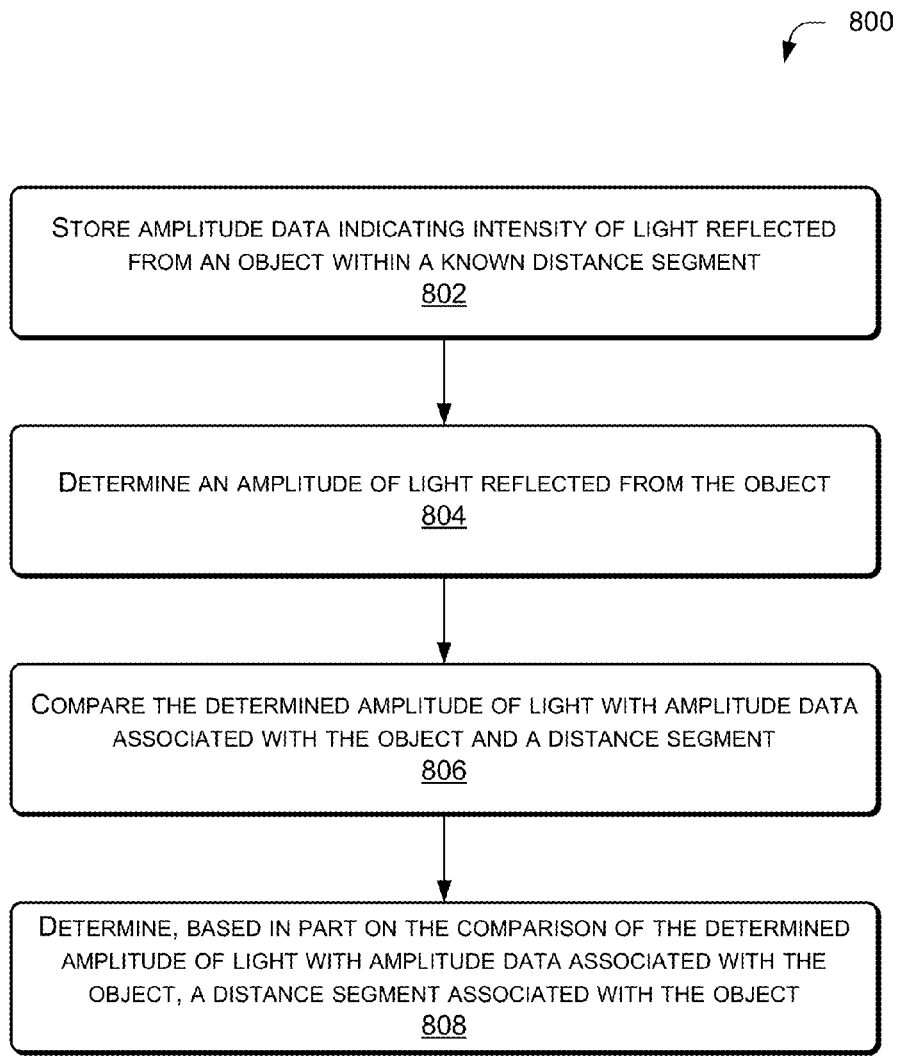
FIG. 8 is a flow diagram of an illustrative process to determine a distance segment of an object using a light sensor that measures an amplitude of light that is reflected from the object.

FIG. 8 is a flow diagram of an illustrative process 800 to determine a distance segment of an object using a light sensor that measures an amplitude of light that is reflected from the object.

At 802, amplitude data may be stored that indicates an intensity of light reflected from an object within a distance segment of a plurality of equal distance segments. For example, a distance segment may be a distance range between 4 m and 8 m, where the distances segments are each have a 4 m length (e.g., 0 m-4 m, 4 m-8 m, 8 m-12 m, 12 m-16 m . . . , etc.). This may be a calibration process that is performed prior to use of the ARFN 102 during a current distance measurement. For example, a user may place an object within a known distance segment during a calibration process. The ARFN 102 may then identify the object and determine an amplitude of a surface area of the object. The ARFN 102 may determine an amplitude for each different type of surface when the object includes surfaces having different materials, which may absorb or reflect different amounts of light. The calibration process may be used to train a classifier and/or populate a look up table.

At 804, after the calibration, the light sensor may measure an amplitude of light reflected from a surface area of the object.

At 806, the determined amplitude of the reflected light may be compared to the amplitude data stored in a look up table, classifier, etc., as described in the operation 802. When the determined amplitude is greater than an entry of compared amplitude data, then the determined amplitude may indicate that the distance segment of the measurement from the operation 804 is closer than the distance segment associated with the entry of the compared amplitude data. For example, when the determined amplitude is 9 lumens/m^2 and is compared to a look up table shown in Table 1, (which contains illustrative data), then the determined amplitude may be used to determine that the distance segment is between 8 m and 10 m. In accordance with some embodiments, the amplitude data may be associated with a particular surface to account for light absorption properties of the surface. The data in a look up table may be tailored to the surface or may include data for various types of surfaces. The surfaces may be determined by the ARFN 102 using the techniques discussed above. In some embodiments, the Table 1 may include other information such as uncertainty or error thresholds and/or other relevant data.

TABLE 1

| Amplitude -- Intensity of light (lumens/meters^2) | Distance |
| --- | --- |
| 5 ln/m^2 | 10 m |
| 10 ln/m^2 | 8 m |
| 10 ln/m^2 | 7 m |

At 808, the distance segment (or the distance) may be determined based in part on the comparison of the determined amplitude of light with the amplitude data associated with the object via the operation 806. For example, when the light sensors collected data that indicates various candidate distances, such as 1 m, 5 m, 9 m, and 13 m, and the distance segment based on the comparison (via the operation 806) indicates a distance segment of 8 m to 10 m, then the true distance is likely to be the candidate distance of 9 m.

In some embodiments, the classifier and/or look up table may maintain values for different materials and/or for different objects because some materials and surfaces may absorb more light or reflect less light than other materials and surfaces.

Figure 9:
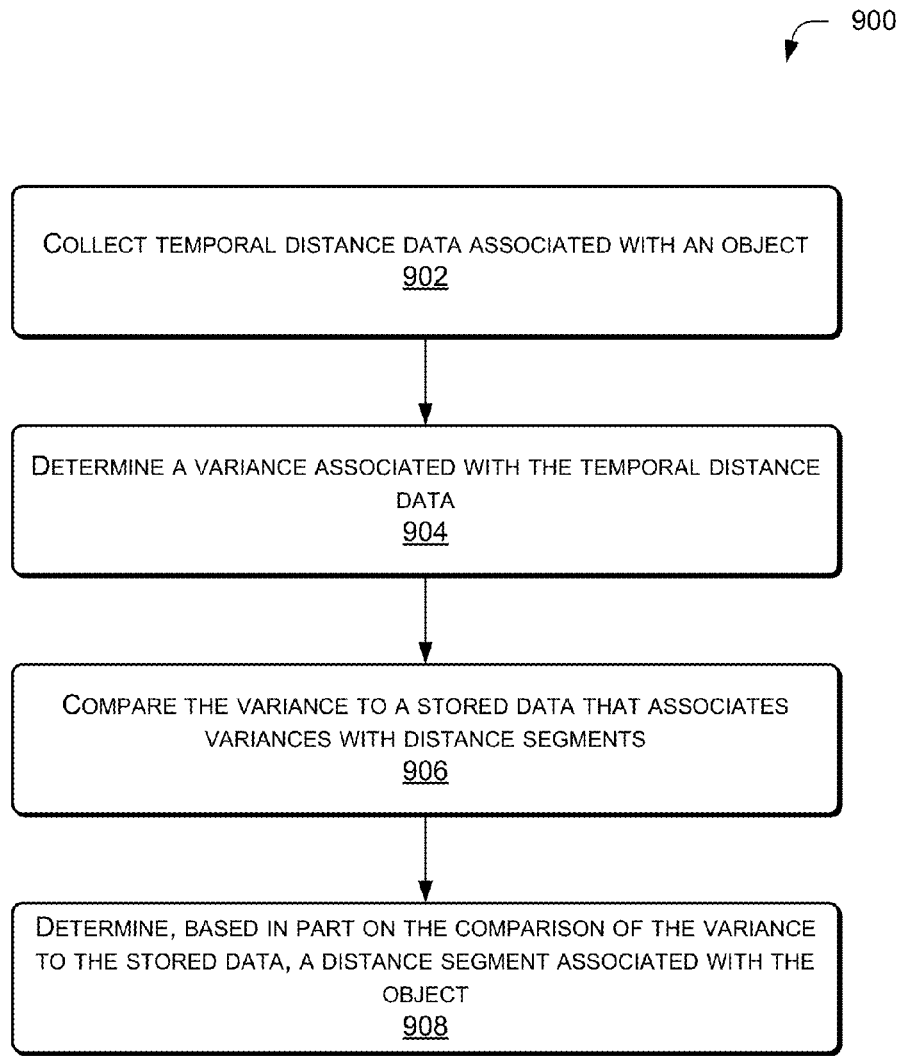
FIG. 9 is a flow diagram of an illustrative process to determine a distance segment of an object by measuring temporal variations of measurements of light that is reflected from the object.

FIG. 9 is a flow diagram of an illustrative process 900 to determine a distance segment of an object by measuring temporal variations of measurements of light that is reflected from the object.

At 902, distance information may be collected at a sampling rate. For example, a sampling rate may collect many measurements over a relatively short period of time (e.g., 100 samples/sec, 1000 samples/sec, etc.). A collection of at least some of these samples creates temporal distance data. For example, a selection of x number of consecutive samples or x number of samples from within a threshold period of time may be used as the temporal distance data, where x is a whole number. The temporal distance data may be collected while an object is known to be stationary or over such a short period of time that movement of the object is negligible.

At 904, a variance may be determined from the temporal distance data. For example, the variance may be a standard deviation of the temporal distance information, a maximum range of the temporal distance data, and/or other calculations that represent variations of the temporal distance data.

At 906, the variance may be compared to stored data that associates variances of temporal data with a distance segment of a plurality of distance segments. As discussed above, a greater variation in the temporal distance data is indicative of a distance segment that is farther from the light sensor. For example, when a variation is calculated based on measured distances and includes a standard deviation of 2.3 cm, and the variation is compared to a look up table shown in Table 2, (which contains illustrative data), then the determined variation may be used to determine that the distance segment is between 8.5 m and 10 m. In some embodiments, the Table 2 may include other information such as uncertainty or error thresholds and/or other relevant data.

TABLE 2

| Variation (intensity of light) | Distance |
| --- | --- |
| 1 cm | 7 m |
| 2 cm | 8.5 m |
| 3 cm | 10 m |
| 4 cm | 12 m |

At 908, the distance segment (or the distance) may be determined based in part on the comparison of the determined variation with the stored data that associates variances of temporal data with distance segments via the operation 906. For example, when the light sensors collected data that indicates various candidate distances, such as 1 m, 5 m, 9 m, and 13 m, and the distance segment based on the comparison (via the operation 906) indicates a distance segment of 8.5 m to 10 m, then the true distance is likely to be the candidate distance of 9 m.

Figure 10:
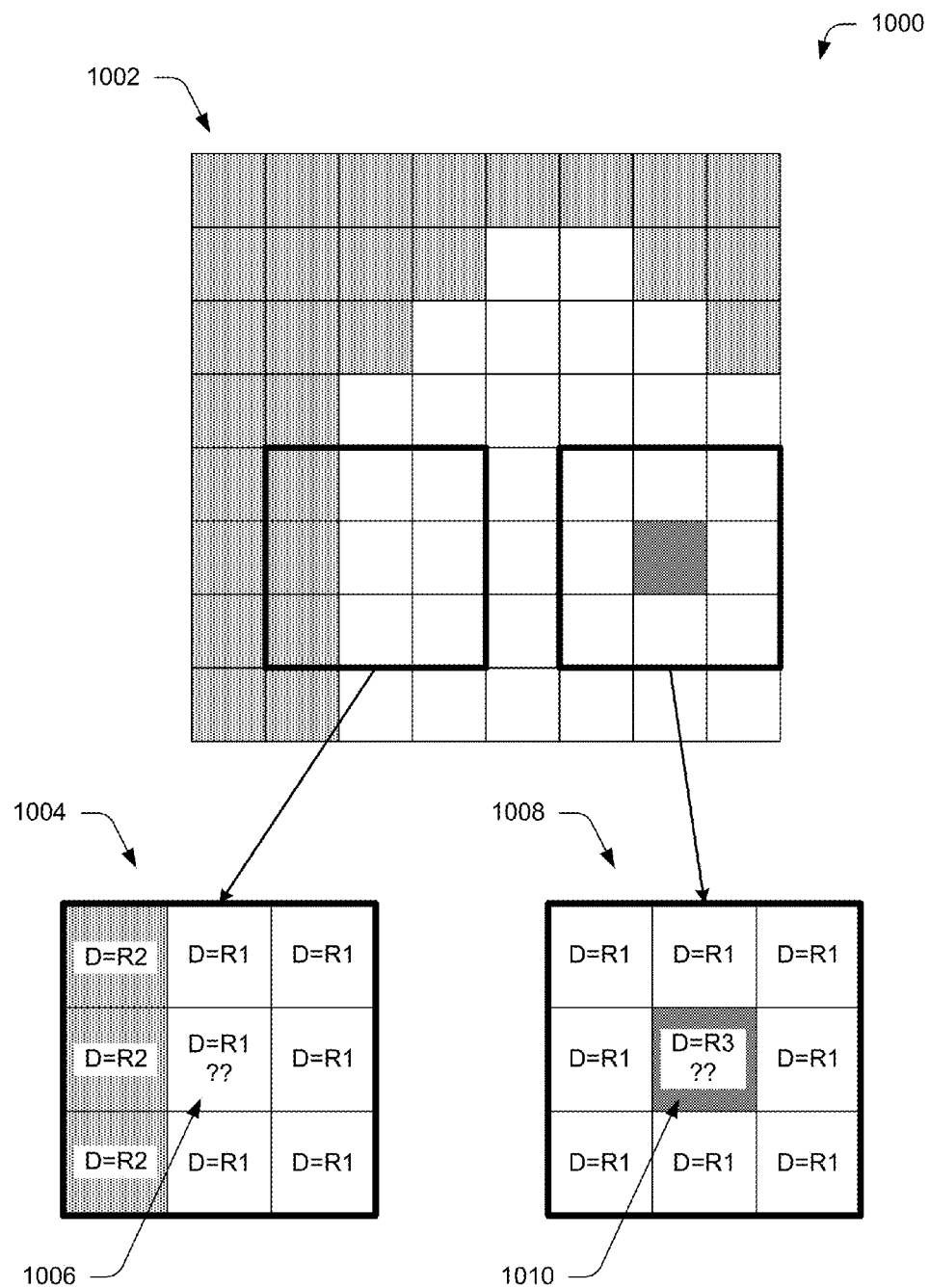
FIG. 10 is a schematic diagram showing distance data of a plurality of surface areas and used to provide an analysis of data associated with a surface area in comparison with data associated with adjacent surface areas.

FIG. 10 is a schematic diagram showing distance data of a plurality of surface areas 1000. The distance data is used to provide an analysis of data associated with a surface area in comparison with data associated with adjacent surface areas (also referred to herein as "neighbor analysis"). The data associated with the surface areas may include one or more of distance information derived from ToF data, measured light ratios, intensity of light values, data representing variances of data over a period of time, and/or other types of data. The surface areas 1000 may be represented by pixels 1002 of light data captured by the light sensor. Each of the pixels may be associated with distance data (or other data as discussed above). For example, using the process 600, and possibly with the evidence obtained in the processes 700 and 800, each pixel may be associated with a distance value. At least some of the pixels may be compared to adjacent pixels to determine whether a false distance value (false negative) occurred for a distance determination for a pixel. For example, pixels may be chose systematically (e.g., one by one across a grid, specific selected samples, etc.) or randomly for inspection and comparison to adjacent pixels.

In some embodiments, a first subset 1004 of pixels may be used in a comparison. The first subset 1004 may be a 3×3 block of pixels or other subsets of the pixels. A first inspected pixel 1006 may be a center pixel or other pixel within the first subset 1004 of pixels. When the distance segment of the distance calculated for a pixel is different than the distance segments for distances of the adjacent pixels, then this may outcome may indicate an incorrect distance value for the inspected pixel. As discussed above, other data besides distance data may be used in this comparison.

As shown in FIG. 10, the first inspected pixel 1006 has a first distance segment of "R1" while some adjacent pixels within the first subset 1004 also have distances within the same distance segment (namely within the first distance segment "R1"). Meanwhile a second subset 1008 may include a second inspected pixel 1010. The distance segment of the distance calculated for the second inspected pixel 1010 is different than the distance segments for distances of the adjacent pixels in the second subset 1008. This may indicate that the distance value for the second inspected pixel 1010 is an incorrect distance value. In some embodiments, when the distance value (or other data) reaches or exceeds a threshold amount different than compared values, then the distance value (or other data) may be assumed to be invalid. Specifically, since the distance value for the second inspected pixel 1010 is in a third distance segment "R3" while the adjacent distance segment values are in the first distance segment "R1", and a threshold variance is a difference of a single range, than the distance value for the second inspected pixel 1010 is assumed to be invalid because the difference is two distance segments. Thus, the second inspected pixel 1010 likely contains an incorrect distance value.

Figure 11:
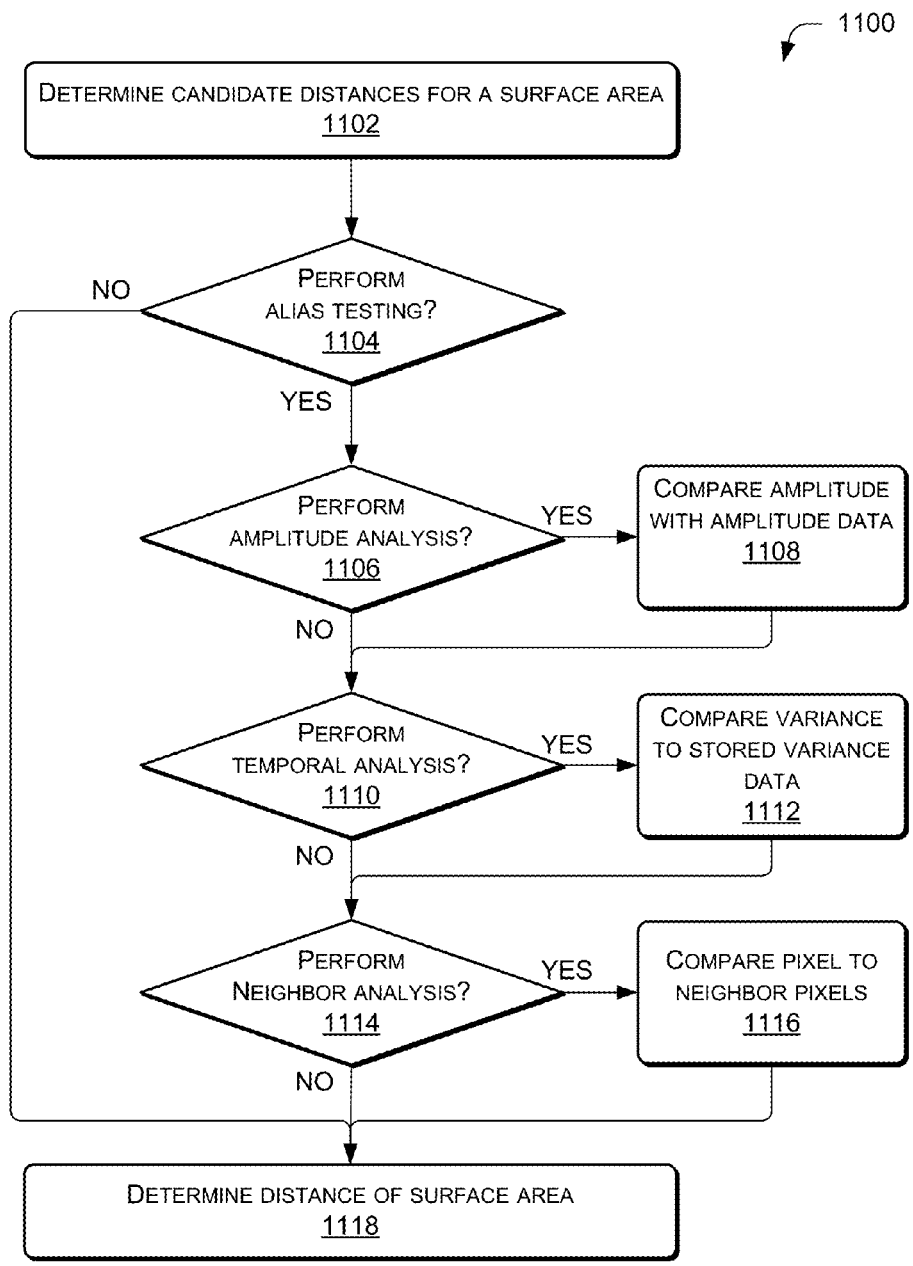
FIG. 11 is a flow diagram of an illustrative process to determine a distance segment of an object using one or more of the techniques shown in FIGS. 8-10.

FIG. 11 is a flow diagram of an illustrative process 1100 to determine a distance segment of an object using one or more of the techniques shown in FIGS. 8-10.

At 1102, a plurality of candidate distances may be determined for a surface area. The candidate distances may be determined using ToF data obtained by a light sensor that detects light reflected from the surface area. The candidate distances may be determined using a sampling frequency and may represent data over a period of time.

At 1104, a determination may be made as to whether to perform testing to determine a distance segment for distances obtained at the operation 1102, such as when alias distances are possible. For example, in some instances, a modulation range may be set at such that the distance segment is the same as or exceeds a range in a field of view of the light sensor. In such a situation, the determined distances from the operation 1102 will not have aliased distances since the distance segment covers the field of view in this example (e.g., closed room, etc.). However, when the modulation frequency is set to a higher value (which allows for more accurate distance data), aliased distances may be present. When alias testing is to be performed (following the "yes" route from the decision operation 1104), then the process 1100 may advance to a decision operation 1106.

At 1106, a determination may be made as to whether to perform the amplitude analysis (described in the process 800) to determine a distance segment associated with distances determined at the operation 1102. The amplitude (light intensity) analysis may be performed when calibration data is available for a comparison via a look up table, a classifier, etc. When the amplitude analysis is to be performed (following the "yes" route from the decision operation 1106), then the process 1100 may advance to an operation 1108 that performs the amplitude analysis by comparing the amplitude of distance data collected at the operation 1102 with the stored amplitude data as described with reference to the process 800. Following the comparison at the operation 1108 or the "no" route from the decision operation 1106, the process 1100 may advance to a decision operation 1110.

At 1110, a determination may be made as to whether to perform the temporal analysis (described in the process 900) to determine a distance segment associated with distances determined at the operation 1102. The temporal analysis may be performed when calibration data is available for a comparison via a look up table, a classifier, etc. When the temporal analysis is to be performed (following the "yes" route from the decision operation 1110), then the process 1100 may advance to an operation 1112 that performs the temporal analysis by comparing the variance of temporal distance data collected at the operation 1102 with the stored baseline variance data as described with reference to the process 900. Following the comparison at the operation 1112 or the "no" route from the decision operation 1110, the process 1100 may advance to a decision operation 1114.

At 1114, a determination may be made as to whether to perform the neighbor analysis (described in the process 1000) to determine a distance segment associated with distances determined at the operation 1102. The neighbor analysis may be performed when distance data is known for adjacent (neighboring) surface areas (e.g., pixels). When the neighbor analysis is to be performed (following the "yes" route from the decision operation 1114), then the process 1100 may advance to an operation 1116 that performs the neighbor analysis by comparing the distance associated with a surface area to distances of adjacent surface areas collected at the operation 1102 as described with reference to the process 1000. Following the comparison at the operation 1116 or the "no" route from the decision operation 1104 or 1114, the process 1100 may advance to an operation 1118.

At 1118, the distance of the surface area to the light sensor (or other desired distance) may be determined from the candidate distances, based in part of any results of the operations 1108, 1112, 1116, and/or information associated with an environment where the distances are measured.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a light source to emit pulses of light at a predetermined frequency;
   a sensor housing including at least two light sensors to detect light emitted from the light source and light reflected off of a surface of an object, the two light sensors including:
      a first light sensor to measure an intensity of light detected during a first time interval and determine a first measured intensity value, and
      a second light sensor to measure an intensity of light detected during a second time interval, equal to the first time interval, and determine a second measured intensity value, wherein the first light sensor is off during the second time interval and the second light sensor is off during the first time interval; and
   one or more processors to:
      determine a ratio of the first measured intensity value to the second measured intensity value;
      determine a variance of at least the ratio and a prior ratio determined from prior measured intensity values;
      compare the variance to baseline variance data that associates the variance with a distance range, the distance range including a minimum distance and a maximum distance defined by a distance of light travel during one cycle of the predetermined frequency;
      select the distance range to indicate candidate distances for a distance between the sensor housing and the surface; and
      determine the distance between the sensor housing and the surface based at least in part on the ratio and the candidate distances included in the distance range.

2. The system of claim 1, wherein determining the variance from at least the ratio and the prior ratio further comprises:
   accessing additional first measured intensity values obtained by the first light sensor, and
   determining the variance based at least in part on the additional light intensity values.

3. The system of claim 2, wherein light associated with the additional measured intensity values is captured within a predetermined amount of time before the first time interval.

4. The system of claim 1, wherein determining the variance includes determining measurement inconsistencies attributed to the distance being within the distance range, the measurement inconsistencies causing at least part of the variance.

5. The system of claim 1, wherein:
the two light sensors measure intensity of light reflected off of the surface located at a first predetermined distance from the sensor housing;
the two light sensors measure intensity of light reflected off of the surface located at a second predetermined distance from the sensor housing; and
the one or more processors store the measured intensity of light for at least the first and second predetermined distances as the baseline variance data.

6. The system of claim 1, wherein:
the first light sensor takes multiple measurements of an intensity of light reflected from the surface located a predetermined distance from the sensor housing; and
the one or more processors determine a calibration variance of the multiple measurements and store the calibration variance and the predetermined distance as one of multiple entries in the baseline variance data.

7. The system of claim 1, further comprising:
determining a first distance between a first portion of the surface and the sensor housing;
determining a second distance between a second portion of the surface and the sensor housing; and
determining that the first and second distances are within a threshold variance for the surface.

8. The system of claim 1, wherein the one or more processors determine that the surface has moved relative to the two light sensors based at least in part on a comparison of the determined distance with a previously determined distance.

9. The system of claim 1, further comprising:
determining a first distance between a first portion of the surface and the sensor housing;
determining a second distance between a second portion of the surface and the sensor housing;
determining that the first and second distances are outside of a threshold variance for the surface; and
determining a new distance range associated with the first portion or the second portion of the surface, the new distance range used to determine a new distance for the first distance or the second distance.

10. A method comprising:
emitting light in pulses;
measuring, via a sensor device, an intensity of a pulse of light after the pulse of light is reflected off a surface of an object, the measuring providing a first measured intensity value of light associated with a first interval and a second measured intensity value of light associated with a second interval;
comparing the first measured intensity value of light to the second measured intensity value of light;
determining a variance of at least the first measured intensity value of light and a prior measured intensity value of light;
comparing the variance to baseline variance data that associates the variance with a distance range, the distance range including a minimum distance and a maximum distance defined by a distance of light travel during one cycle of the frequency;
selecting the distance range to indicate candidate distances for a distance between the sensor device and the surface; and
determining the distance based at least in part on the comparing the first measured intensity value of light to the second measured intensity value of light and the distance range, the distance being within the distance range.

11. The method of claim 10, further comprising measuring an intensity of a prior pulse of light to determine the prior measured intensity value within a predetermined amount of time before the measuring of the intensity of the pulse of light.

12. The method of claim 10, further comprising dividing the surface into a plurality of surface areas, and wherein the determining the distance range for a surface area is based at least in part on determined distance ranges of other surface areas of the plurality of surface areas that are adjacent to the surface area.

13. The method of claim 10, further comprising calculating the variance as a standard deviation.

14. The method of claim 10, further comprising:
determining a first distance between a first portion of the surface and the sensor device;
determining a second distance between a second portion of the surface and the sensor device; and
determining that the first and second distances are within a threshold variance for the surface.

15. The method of claim 10, further comprising storing measured light using one or more capacitors that store energy from a photodiode connected to the one or more capacitors.

16. A method comprising:
emitting light in pulses;
measuring, using a sensor device, an intensity of a pulse of light after the pulse of light is reflected off a surface of an object, the measuring providing a first measured intensity value of light associated with a first interval and a second measured intensity value of light associated with a second interval;
measuring an intensity of a second pulse of light after the second pulse of light is reflected off the surface of the object, the measuring providing a third measured intensity value of light associated with the first interval and a fourth measured intensity value of light associated with the second interval;
performing a comparison between the first measured intensity value of light and the second measured intensity value of light;
determining a variance of at least the first measured intensity value of light and the third measured intensity value of light or from at least the second measured intensity value of light and the fourth measured intensity value of light;
comparing the variance to baseline variance data that associates the variance with a distance range, the distance range including a minimum distance and a maximum distance defined by a distance of light travel during one cycle of the frequency;
selecting the distance range to indicate candidate distances for a distance between the sensor device and the surface; and
determining the distance based at least in part on the comparison between the first measured intensity value of light and the second measured intensity value of light, the distance being within the distance range.

17. The method of claim 16, wherein measuring the third measured intensity value of light occurs within a predetermined amount of time after the first measured intensity value of light.

18. The method of claim 16, wherein the variance is based on consecutive measurements of the intensity of light within a predetermined amount of time.

19. The method of claim 16, wherein the selecting the distance range is further based at least in part on a distance range of another surface that is adjacent to the surface.

20. The method of claim 16, further comprising:
   determining a first distance between a first portion of the surface and the sensor device;
   determining a second distance between a second portion of the surface and the sensor device;
   determining that the first and second distances are outside of a threshold variance for the surface; and
   determining a new distance range associated with the first portion or the second portion of the surface, the new distance range used to determine a new distance for the first distance or the second distance.

* * * * *